US009481421B2

(12) United States Patent
Puello

(10) Patent No.: US 9,481,421 B2
(45) Date of Patent: Nov. 1, 2016

(54) BACKLIGHT FOR BICYCLES

(71) Applicant: Winora-Staiger GmbH, Sennfeld/Schweinfurt (DE)

(72) Inventor: Felix Puello, Schonungen (DE)

(73) Assignee: WINORA-STAIGER GMBH (DE)

( * ) Notice: Subject to any disclaimer, the term of this patent is extended or adjusted under 35 U.S.C. 154(b) by 0 days.

(21) Appl. No.: 14/470,514

(22) Filed: Aug. 27, 2014

(65) Prior Publication Data

US 2015/0062938 A1    Mar. 5, 2015

(30) Foreign Application Priority Data

Aug. 28, 2013    (DE) .................. 10 2013 014 337

(51) Int. Cl.
| | | |
|---|---|---|
| *B62J 6/04* | (2006.01) | |
| *F21S 8/10* | (2006.01) | |
| *B62J 6/00* | (2006.01) | |
| *B62K 19/40* | (2006.01) | |

(52) U.S. Cl.
CPC .............. *B62J 6/04* (2013.01); *F21S 48/2237* (2013.01); *F21S 48/2268* (2013.01); *B62J 6/003* (2013.01); *B62K 19/40* (2013.01)

(58) Field of Classification Search
CPC .... B62J 6/04; F21S 48/2268; F21S 48/2237; B62K 19/40
USPC ..................... 362/473, 540, 541, 542, 511
See application file for complete search history.

(56) References Cited

U.S. PATENT DOCUMENTS

| | | | | |
|---|---|---|---|---|
| 3,890,497 A * | 6/1975 | Rush | ............... | G02B 6/001 116/173 |
| 6,336,736 B1 * | 1/2002 | Edmond | ............... | B62J 6/00 362/473 |
| 6,997,584 B1 * | 2/2006 | Rothan | ............... | B62J 6/00 280/200 |

FOREIGN PATENT DOCUMENTS

| | | |
|---|---|---|
| CN | 202581051 | 12/2012 |
| DE | 3147805 | 6/1983 |
| DE | 202007011695 | 11/2007 |
| DE | 202007012416 | 1/2009 |
| DE | 202010003752 | 8/2010 |
| DE | 202010011682 | 11/2010 |
| DE | 202010011829 | 1/2011 |
| DE | 102011051978 | 1/2013 |
| EP | 2101202 | 9/2009 |
| FR | 2977228 | 1/2013 |

(Continued)

OTHER PUBLICATIONS

European Search Report dated Jan. 9, 2015 from counterpart App No. 14002966.1.

(Continued)

*Primary Examiner* — Laura Tso
(74) *Attorney, Agent, or Firm* — Shuttleworth & Ingersoll, PLC; Timothy J. Klima

(57) ABSTRACT

The invention relates to a rear bicycle light having a socket to be fastened on the frame of the bicycle, a lighting unit being received in said socket, and a luminous body for emitting the light emitted to the surroundings by the lighting unit during operation. According to the invention, the luminous body is an optical fiber emitting the light emitted by the lighting unit during through at least part of the peripheral surface thereof operation to the surroundings.

20 Claims, 2 Drawing Sheets

(56) References Cited

FOREIGN PATENT DOCUMENTS

Figure 1:
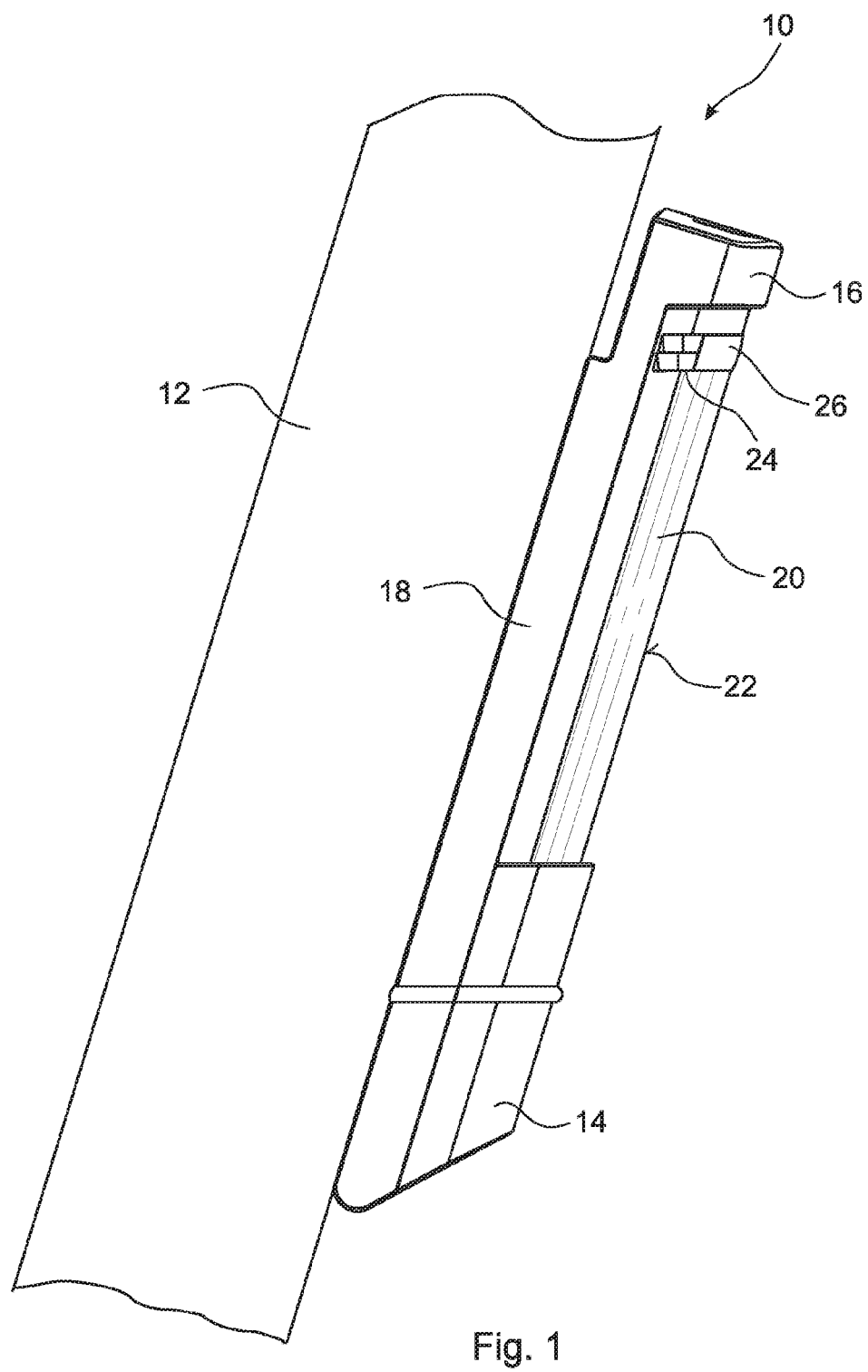

| | | |
|---|---|---|
| JP | 2005112317 | 4/2005 |
| WO | 2013/064948 | 5/2013 |

OTHER PUBLICATIONS

Office Action issued by the German Patent Office dated Aug. 5, 2014 for counterpart German Patent Application No. 10 2013 014 337.3.

\* cited by examiner

BACKLIGHT FOR BICYCLES

This application claims priority to German Patent Application DE102013014337.3 filed Aug. 28, 2013, the entirety of which is incorporated by reference herein.

The invention relates to a rear bicycle light having a socket to be fastened on the frame of the bicycle, a lighting unit being received in said socket, and a lighting body for emitting the light emitted by the lighting unit to the surroundings during operation.

In general, bicycles that are used on public streets are required to carry lights. The bicycles must be equipped with both active lighting devices, such as the front lamp and rear light, as well as passive lighting components, such as reflectors.

Due to the wide varieties of types of frames, tire sizes, and design features in the frame shape, sufficient illumination can often be obtained only with great effort. In particular, the arrangement of the rear light on the bicycle frame causes problems time after time. For mountain bikes and racing bikes that often are not equipped with fenders, the rear light can only be installed on the seat tube or on stays of the rear wheel suspension. If the rear light is mounted on the seat tube, the problem often occurs that the rear light is at least partially hidden by the rear wheel. Rear lights mounted on the side of the bicycle, however, are exposed and are often damaged. Regardless of this, the lighting devices that are often installed subsequently also have a negative effect on the design of the bicycle.

The object of the present invention is therefore to disclose a rear bicycle light that is easy for following traffic to detect when mounted on the bicycle frame and is simultaneously well protected against outside influences.

The object is achieved according to the invention for a rear bicycle light of the type indicated above in that the lighting body is an optical fiber emitting the light emitted by the lighting unit during operation through at least part of the peripheral surface thereof to the surroundings.

In contrast to the typical practice, the lighting body according to the invention does not use a combination of reflector and diffuser wherein the reflector casts light emitted by the lighting unit during operation onto the diffuser, and the diffuser diffuses the light beams across a wide area. Rather, the lighting body used is an optical fiber guiding the light emitted by the lighting unit during operation to the desired location in a defined manner and simultaneously emits said light through at least part of the peripheral surface thereof in a large area.

The benefit of using the optical fiber is particularly that the actual lighting unit, which in the prior art must typically be disposed in the direct vicinity of the lighting body, can be attached to the bicycle frame at a suitable location while the optical fiber conducts the light in a targeted manner to the location where the rear light is actually to be emitted. The optical fiber does not thereby need to emit light over the entire length thereof. The invention particularly includes the case that optical fiber is partially covered, such as by means of covers acting as shielding, and emits light to the surrounding only at the desired locations.

The shape of the optical fiber can also be adapted to the curve of the bicycle frame, and thus is not required to have a bar shape.

Independently thereof it is further advantageous that the optical fiber can transmit and emit light of different colors independently of the coloring of said fiber. The lighting unit can thus have a diode emitting red light, for example.

Further advantages of the invention are found in the following description, including the claims, abstract and the drawings.

In a particularly preferred embodiment of the rear bicycle light according to the invention, the optical fiber is bar-shaped and one end thereof is retained in the socket near the lighting unit such that the light emitted by the lighting unit during operation falls on the end face of the optical fiber. In said type of arrangement the lighting unit itself can be disposed at a distance from the actual lighting location. It is furthermore also possible to receive in the socket of the rear bicycle light all of the components needed for operating the lighting unit, such as electronic controls, power supply or connection to the power supply, wherein said socket can then be relatively large in size. The bar-shaped optical fiber can have a round or oval cross section that is uniform over the length thereof. It is also conceivable to configure the cross section of the optical fiber having a defined contour, such as U-shaped, triangular, polygonal, or T-shaped, mushroom-shaped, etc.

In order to protect the bar-shaped optical fiber against external influences such as impacts, rain, moisture, etc., the rear bicycle light according to the invention preferably comprises a counter bracket connected to the socket by an elongated connecting element, wherein the bar-shaped optical fiber is retained at both ends between the socket and the counter bracket and the elongated connecting element, covers part of the peripheral surface of the optical fiber. It is thereby not only achieved that the optical fiber is protected against external influences. It is also ensured that the rear light does not shine forward unintentionally as seen in the direction of travel, which could cause confusion both for the bicycle rider and in the oncoming traffic. The width and cross section of the elongated connecting element can thereby intentionally be adapted to the cross section of the optical fiber, so that the optical fiber is partially enclosed by the connecting element over the cross section thereof and is received by the same.

In order to additionally direct the light emitted by the optical fiber in a defined direction, it is further proposed that the surface of the elongated connecting element facing the optical fiber is provided at least in segments with a reflector. The reflector can thereby be implemented as a separate insert. It is alternatively proposed that the surface of the connecting element be provided or have adhered thereto a reflecting coating.

In order to achieve a defined emission of the light, a particularly preferred embodiment of the rear bicycle light according to the invention proposes that at least one optical element is provided on the optical fiber, such as by forming corresponding material buildup, by means of which part of the light passing through the optical fiber is focused and directed normal to the peripheral surface of the optical fiber.

For the variant of the rear bicycle light according to the invention equipped with the connecting element, the optical fiber preferably has a rounded cross section at least at the peripheral surface thereof facing away from the connecting element transverse to the longitudinal direction thereof. It is thereby achieved that the optical fiber emits the light uniformly and thus the bicycle equipped with the rear bicycle light according to the invention is very easily detected by the following traffic.

In order to make installation easier for the variant of the rear bicycle light according to the invention equipped with the connecting element, the socket, the connecting element, and the counter bracket form a common rear side facing away from the optical fiber, on which is formed a concave recess having a constant cross section and extending over the entire length of the rear side. The concave cross section of the recess makes installation of the rear bicycle light easier, particularly on tubes of the bicycle frame, because the rear bicycle light aligns itself to the tube by means of the concave cross section and thereby makes contact with the tube over a large area and in this manner is also secured against slipping sideways.

The use of at least one latching connection is preferably proposed for attaching the rear bicycle light to the bicycle frame. In order to form the latching connection, for example a latching protrusion is attached to the bicycle frame at a suitable location and can latch to a latching receptacle formed on the socket, for example. It is alternatively also possible to attach the rear bicycle light to the bicycle frame by means of clamps, fittings, and the like. It is also within the scope of the invention to attach the rear bicycle light to the bicycle frame by adhesion by means of a suitable adhesive.

The lighting unit of the rear bicycle light according to the invention preferably comprises a dedicated power supply, such as in the form of batteries or rechargeable batteries. Said, power supply is received in the socket of the rear bicycle light, for example. The controls necessary for operating the rear bicycle light can also be received in the socket. If the rear bicycle light has the counter bracket and the connecting element, then the counter bracket and the connecting element can be implemented as hollow bodies also or merely implemented for receiving the power supply and the controls. It is alternatively or additionally possible to connect the rear bicycle light to the power supply of the bicycle, such as the dynamo or a rechargeable battery unit of the bicycle.

Figure 2:
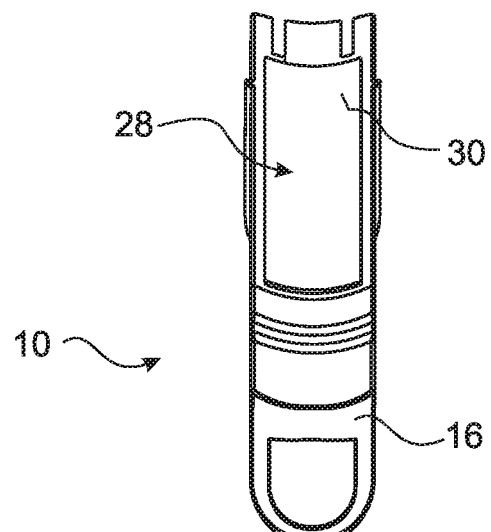
Figure 3:
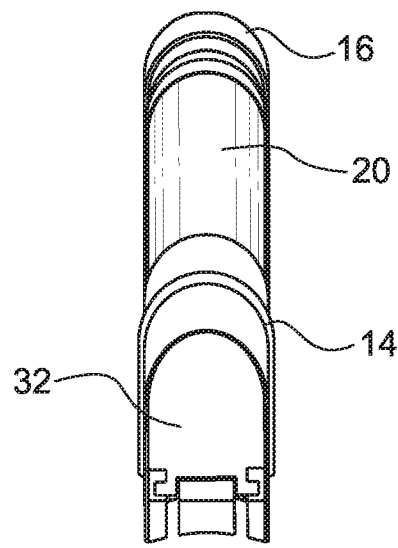

The invention is described in more detail below, using an embodiment example and referencing the figures. Shown are:

FIG. 1 A side view of a first embodiment example of a rear bicycle light according to the invention mounted on a seat tube, FIG. 2 A plan view of the rear bicycle light in the unmounted condition, and FIG. 3 A bottom view of the rear bicycle light in the unmounted condition.

FIG. 1 shows a side view of a rear bicycle light 10 according to the invention mounted on a seat tube 12 of a bicycle frame not shown in further detail.

The rear bicycle light 12 comprises a socket 14, a counter bracket 16, and an elongated connecting element 18 connecting the socket 14 to the counter bracket 16. An optical fiber 20 is disposed between the socket 14 and the counter bracket 16. The lower end of the optical fiber 20 is attached in the socket 14, while the upper end is attached in the counter bracket 16.

As FIGS. 1, 2, and 3 show, the optical fiber 20 is bar-shaped and has a substantially round cross section. The lower end face (not shown) of the optical fiber 20 is disposed and attached in the socket 14 such that the lower end face of the optical fiber 20 is positioned near the light emission of a lighting unit (also not shown) received in the socket 14. As soon as the lighting unit is placed in operation, the lighting unit illuminates the end face of the optical fiber 20 with red light by means of a diode or by means of another luminous element. The optical fiber 20 is implemented such that light from the lighting unit impinging on the end face is guided through the optical fiber 20 and thereby uniformly emitted over the entire peripheral surface 22 to the surroundings.

In order to further increase the emission intensity, a beam splitter 24 is further provided on the optical fiber 20 near the counter bracket 16 on the peripheral surface 22 of the optical fiber 20, said splitter partially bundling the light guided through the optical fiber 20 and guiding said light out of the optical fiber approximately normal to the peripheral surface 22. A peripheral bulge-shaped protrusion 26 is thereby also formed in the region of the beam splitter and emits the guided light to the surroundings in a predetermined light cone of approximately 20 to 30° relative to the normal.

The elongated connecting element 18 has a receptacle (not shown) having a rounded cross section on the inner side of said element facing toward the optical fiber 20, the radius of curvature of said receptacle at least approximately matching the radius of curvature of the optical fiber 20. The edge of the receptacle is simultaneously advanced in the direction of the optical fiber 20 to the extent that the peripheral surface 22 of the optical fiber 20 is partially covered and the optical fiber 20 emits substantially toward the relative to the bicycle frame in the normal direction of travel. The inner side of the receptacle is further provided with a reflective layer, so that the light emitted by the optical fiber 20 into the receptacle is reflected toward the rear.

As shown particularly in FIG. 2, the socket 14, the connecting element 18, and the counter bracket 16 form a common rear side 28 facing away from the optical fiber 20. The rear side 28 has a concave recess 30 of uniform cross section extending over the entire length thereof. The concave cross section of the recess 30 makes installing the rear bicycle light 10 on the seat tube 12 of the bicycle frame easier, because the rear bicycle light aligns itself to the seat tube 12 by means of the concave cross section and thereby makes contact with the seat tube over a large area and in this manner is also secured against slipping sideways.

As FIG. 3 shows, a pivoting cover 32 is provided on the underside of the socket 14. The cover 32 is secured by means of a latching connection and allows access to the interior of the socket 14 and the connecting element 16 implemented as a hollow body. The control elements required for operating the lighting unit and a power supply are received in the connecting element 16 and in the socket 14.

The rear bicycle light 10 is attached to the seat tube 12 by means of a latching connection. To this end, a latching protrusion (not shown) is attached on the seat tube 12 and latches to a latching receptacle formed on the connecting element. An access opening is further provided on the seat tube 12, by means of which a control line run from the handlebar is run into the socket 14, by means of which the rear bicycle light 10 can be actuated from the handlebar.

During operation the optical fiber 20 acts as a lighting body by means of which the light emitted by the lighting unit is guided to the desired location on the bicycle and simultaneously is emitted through at least part of the peripheral surface 22 thereof over a large area.

The benefit of using the optical fiber 20 is particularly that the actual lighting unit can be attached to the bicycle frame at a suitable location while the optical fiber 20 conducts the light in a targeted manner to the location where the rear light is actually to be emitted. The optical fiber 20 thereby does not emit light over the entire length there of, but rather emits the light to the surroundings only at the desired locations.

LIST OF REFERENCE NUMERALS

10 Rear bicycle light
12 Seat tube
14 Socket

16 Counter bracket
18 Connecting element
20 Optical fiber
22 Peripheral surface
24 Beam splitter
26 Bulge-shaped protrusion
28 Rear side
30 Recess
32 Cover

The invention claimed is:

1. A rear bicycle light comprising:
a socket to be fastened on a frame of a bicycle,
a lighting unit being received in said socket, and
a lighting body for emitting the light emitted by the lighting unit during operation to a surrounding environment,
wherein the lighting body is an optical fiber emitting the light emitted by the lighting unit during operation through at least part of a peripheral surface of the optical fiber to the surrounding environment
a counter bracket;
an elongated connecting element connecting the counter bracket to the socket,
wherein the optical fiber is disposed between the socket and the counter bracket and the elongated connecting element covers part of a peripheral surface of the optical fiber.

2. The rear bicycle light according to claim 1, wherein the optical fiber is bar shaped and retained in the socket near the lighting unit such that the light emitted by the lighting unit during operation shines on an end face of the optical fiber.

3. The rear bicycle light according to claim 2, wherein the surface of the elongated connecting element facing the optical fiber includes a reflector at least along a portion of the elongated connecting element.

4. The rear bicycle light according to claim 3, and further comprising at least one optical element provided on the optical fiber for partially focusing and deflecting a part of the light passing through the optical fiber normal to the peripheral surface of the optical fiber.

5. The rear bicycle light according to claim 4, wherein the optical fiber comprises a rounded cross section at least at the peripheral surface facing away from the elongated connecting element as viewed perpendicular to a longitudinal axis of the optical fiber.

6. The rear bicycle light according to claim 5, wherein the socket, the elongated connecting element and the counter bracket form a common rear side facing away from the optical fiber on which a concave recess of uniform cross section is formed over an entire length of the rear side.

7. The rear bicycle light according to claim 6, and further comprising at least one latching connection for fastening the rear bicycle light to the bicycle frame.

8. The rear bicycle light according to claim 7, wherein the lighting unit comprises a dedicated power supply.

9. The rear bicycle light according to claim 1, wherein the surface of the elongated connecting element facing the optical fiber includes a reflector at least along a portion of the elongated connecting element.

10. The rear bicycle light according to claim 9, and further comprising at least one optical element provided on the optical fiber for partially focusing and deflecting a part of the light passing through the optical fiber normal to the peripheral surface of the optical fiber.

11. The rear bicycle light according to claim 10, wherein the optical fiber comprises a rounded cross section at least at the peripheral surface facing away from the elongated connecting element as viewed perpendicular to a longitudinal axis of the optical fiber.

12. The rear bicycle light according to claim 11, wherein the socket, the elongated connecting element and the counter bracket form a common rear side facing away from the optical fiber on which a concave recess of uniform cross section is formed over an entire length of the rear side.

13. The rear bicycle light according to claim 12, and further comprising at least one latching connection for fastening the rear bicycle light to the bicycle frame.

14. The rear bicycle light according to claim 13, wherein the lighting unit comprises a dedicated power supply.

15. The rear bicycle light according to claim 1, and further comprising at least one optical element provided on the optical fiber for partially focusing and deflecting a part of the light passing through the optical fiber normal to the peripheral surface of the optical fiber.

16. The rear bicycle light according to claim 1, wherein the optical fiber comprises a rounded cross section at least at the peripheral surface facing away from the elongated connecting element as viewed perpendicular to a longitudinal axis of the optical fiber.

17. The rear bicycle light according to claim 1, wherein the socket, the elongated connecting element and the counter bracket form a common rear side facing away from the optical fiber on which a concave recess of uniform cross section is formed over an entire length of the rear side.

18. The rear bicycle light according to claim 1, wherein the surface of the elongated connecting element facing the optical fiber includes a reflector at least along a portion of the elongated connecting element.

19. The rear bicycle light according to claim 1, and further comprising at least one latching connection for fastening the rear bicycle light to the bicycle frame.

20. The rear bicycle light according to claim 1, wherein the lighting unit comprises a dedicated power supply.

* * * * *